United States Patent [19]
Wartski et al.

[11] Patent Number: 5,732,082
[45] Date of Patent: Mar. 24, 1998

[54] SYSTEM AND METHOD FOR MULTI-FRAME RECEIVED QUEUING WITH SORTING IN AN ASYNCHRONOUS TRANSFER MODE (ATM) SYSTEM

[75] Inventors: Mark Crane Wartski; Russell Evan Schroter; Joseph Kinman Lee, all of Raleigh, N.C.

[73] Assignee: International Business Machines Corp., Armonk, N.Y.

[21] Appl. No.: 513,706

[22] Filed: Aug. 11, 1995

[51] Int. Cl.[6] ............................................. H04L 12/56
[52] U.S. Cl. ..................... 370/395; 370/374; 370/399; 370/412; 370/428
[58] Field of Search ............................. 370/395, 399, 370/474, 419, 428, 374, 398, 412, 455

[56] References Cited

U.S. PATENT DOCUMENTS

| | | | |
|---|---|---|---|
| 5,136,584 | 8/1992 | Hedlund | 370/399 |
| 5,303,302 | 4/1994 | Burrows | 370/412 |
| 5,311,510 | 5/1994 | Moriue et al. | 370/428 |
| 5,361,255 | 11/1994 | Diaz et al. | 370/374 |
| 5,483,526 | 1/1996 | Ben-Nun et al. | 370/395 |
| 5,491,691 | 2/1996 | Shtayer et al. | 370/395 |
| 5,495,478 | 2/1996 | Wilkinson et al. | 370/399 |
| 5,563,884 | 10/1996 | Fimoff et al. | 370/395 |

FOREIGN PATENT DOCUMENTS

WO94/15438  7/1994  WIPO.

*Primary Examiner*—Wellington Chin
*Assistant Examiner*—Melissa Kay Carman
*Attorney, Agent, or Firm*—S. B Phillips; Thomas F. Galvin

[57] ABSTRACT

An ATM information system processes information at the frame level using a processor including a device driver; a system memory and an adapter for sorting data cells into partially completed frames stored in the system memory using control information provided by the device driver. A controller in the adapter determines when an end of frame indication is received in a cell and updates a pointer in system memory for a completed frame list to a recently completed frame. The device driver processes frames in a completed frame list according a priority of the list. The device driver processing is independent of the sorting and storing of completed frames received in the system memory which improves the performance of the driver and the ability to handle delay sensitive traffic.

18 Claims, 6 Drawing Sheets

SYSTEM AND METHOD FOR MULTI-FRAME RECEIVED QUEUING WITH SORTING IN AN ASYNCHRONOUS TRANSFER MODE (ATM) SYSTEM

RELATED APPLICATIONS

IBM Docket RA9-95-052 entitled "A System And Method For An Efficient ATM Adapter/Device Driver Interface", U.S. Pat. No. 5,606,599, issued Feb. 25, 1995, discloses simultaneously transmitting frames and reassembling data cells into frames across an adapter/device driver interface essentially independent of the device driver. The related application and the present invention are commonly owned by the assignee of the present invention.

BACKGROUND OF THE INVENTION

1Field of the Invention

This invention relates to communications systems. More particularly, the invention relates to systems and methods for sorting data cells into prioritized lists of completed data frames in an ATM system independent of a system processor.

2Description of the Prior Art

Data frames in ATM networks are segmented into fixed size data units called cells. At each data source, cells from various frames are multiplexed together on the network media. These cell streams are further multiplexed with others within the ATM network. For this reason, the internal arrival time of frames can be as small as a cell time on the media. These times range from 17 microseconds at 25.6 Mbps to about a 177 nanoseconds at 2.4 Gbps.

The network also allows the establishment of Quality 0f Service (QOS) criteria. Among these criteria is the destination applications tolerance to delay. In addition, Operation, Administration, and Maintenance (OAM) cells can be embedded within the frames cell stream. This injects another data stream directly into the user's frame.

The characteristics of ATM traffic creates a number of problems for a device driver in an ATM system processor. First, there is a need to pass completed data frames to the communication subsystem's device driver in a manner that does not require the interaction of the device driver. The minimum frame interarrival time is too short for this to be practical. Secondly, the embedding of OAM cells and the need to satisfy several different delay tolerance criteria, requires frames be sorted so that they can be prioritized for processing. This sorting process is usually assigned to the device driver. Sorting by the device driver is a time consuming process which may cause the communications subsystem to exceed the delay tolerance or, at a minimum, degrade its performance.

In the related prior art, U.S. Pat. No. 5,311,510 issued May 10, 1994, discloses a data storage system for a communication control circuit which allows only necessary data to be stored and memory capacity to be reduced. A register means record a data identifier of a necessary message among messages transmitted through a multiplex transmission line. A storing means includes a first storage area for storing data, which corresponds to a particular data identifying, keying the stored data to said data identifier, and a second storage area for sequentially storing data which corresponds to a plurality of data identifiers other than the particular data identifier. Communication control means determines when a message is taken and whether its data identifier exists in the registering means. If it is determined that the identifier is present, the data corresponding to the data identifier is stored in one of the first and second storage area of the storing means. Data stored in a memory circuit can be replaced by data with a higher priority level making it possible to reduce memory capacity and transmit data with a higher priority level first without adding to a load on a CPU.

U.S. Pat. No. 5,303,302, issued Apr. 12, 1994, discloses a system and method for preventing buffer overflow in a network controller data packet receiver for use in an ATM network. The controller receives interleaved streams of data cells and stores them in a buffer until the end of each packet is received and transmitted or transferred to a host computer. The controller buffer includes a data storage array and a packet directory having an entry for each data packet stored in the data storage array. Each directory entry contains a pointer to the first location in the data storage array where a corresponding data packet is stored. When the amount of data stored in the network controller's packet buffer exceeds a specified limit, indicating that the buffer may overflow, the controller selects at least one partial packet stored in the buffer and transmits the selected partial packet to the host computer indicating that the transmitted packets are incomplete. The controller also stores in the packet directory an entry for each transmitted partial packet. If, after more data cells are received by the network controller, the packet buffer again reaches the specified limit without having received the end of the partial packet previously sent to the host computer, additional portions of the partial packets may be sent to the host computer with an indication of the packet to which they belong, as well as additional selected partial packets. When the end of a data packet is received, and portions of the data packet were previously transferred to the host computer to prevent buffer overflow, the remainder of the data packet in the packet buffer is transmitted to the host computer along with a special end of packet message. The host computer then transmits the complete packet back to the controller using a hardware loopback in the controller. If the host computer is so overloaded that discarding the packet is preferable to the controller, the host software can choose to discard those packets that will not severely impact the system.

U.S. Pat. No. 5,361,255, issued Nov. 1, 1994, discloses switching circuitry for ATM switching of digital information packets between a plurality of inputs and a plurality of outputs while incurring reduced cell losses with minimum propagation delays. Input buffers coupled to the inputs queue packets from each input and retain a copy of first ones of the queued packets. A sorter coupled to the input buffers receive the first ones of the queued packets and rank the packets responsive to addresses associated with the packets. The sorter ranks packets having the same associated address according to the priority data associated with the packets. The sorter further ranks packets having the same associated address and priority data according to age data associated with the packets. The age data is generated independently based upon the number of times a packet fails to reach its address destination and is updated in the copy of the unrouted packets stored in the input buffers. Compare circuitry coupled to the sorter receives the ranked packets from the sorter and simultaneously pass more than one packet up to a maximum number packets having identical addresses. Routing circuitry routes the packets passed by the compare circuitry in response to the associated addresses. After a packet is successfully transferred through the switch, an acknowledgment signal is returned to the sending input buffer circuit. If no acknowledgment signal is received within a predetermined time, the segment is resent.

International Publication WO 94/15438, published Jul. 7, 1994, discloses a device for the conversion of data blocks, frame structured, into ATM cells, and vice versa. The data block frame structures are stored in a buffer unit under the control of a management unit. The data blocks are coupled with a set of parameters set up by terminal identifiers, service or connection identifiers and the cell with terminal or service identification parameters. The '15438 publication improves the conversion process by means of devices guaranteeing a good cost/service relation and which at the same time can be used indifferently in access points, multiplexers and service present in the switching modes in a so called connectless environment. Such devices make it possible to multiplex at the ATM adaption layer several subscribers or several connections up to a limit of 150 M-bits per second.

Summarizing, the prior art prioritizes data cells not ATM frames. Further, the prior art may discard an ATM frame when another frame has a higher priority. Also, the prior stores ATM frames at a communications adapter not in system memory. Finally, the system processor is involved in all of the processing and not when processing is complete which places additional load on the system processor.

Accordingly, there is a need to capture ATM frames and link the frames into specific priority list disjoint from system processing. In so doing, the system processor is free to perform other functions until the complete ATM frame has arrived. Further, there is a need in ATM networks to sort data cells in prioritized frames stored in the system memory and to notify system processor when a frames is complete for processing on the prioritized frame list thereby reducing the load on the system processor in handling frames according to their priority. Also, there is a need to place the frames in permanent memory space on the system side of the ATM network. Once the system is notified that the ATM frame has arrived, the system device driver does not have to perform any data transfers from an adapter. All data is at the system's fingertips.

SUMMARY OF THE INVENTION

An object of the invention is a system and method for sorting of data cells into prioritized frames in an ATM network independent of a system device driver.

Another object is a system and method for directly transferring data cells into frames in system memory of an ATM network.

Another object is a memory in an ATM system for storing linked lists of frames in prioritized received ready lists.

Another object is a system and method for storing completed data frames having a common processing priority in a prioritized received ready list.

Another object is a system and method for storing partially completed data frames in an ATM system until an end of frame indication is received for such frame whereupon the completed data frames is linked in a received ready list according to the priority of the frame.

Another object is a system and method of processing a received ready list of completed frames by a system processor while additional completed frames are added to the received ready list.

Another object is a communication adapter for processing data cells directly into an ATM system memory for storage in prioritized ready received lists for processing by the ATM system.

Another object is a communication adapter and method for processing data cells and partially completed data frames stored in system memory and generating a pointer to the most recently completed data frame in a received ready list.

Another object is a communication adapter and method for generating an interrupt to an ATM system processor indicating the completion of a data frame when an end of frame indication is received.

These and other objects, features and advantages are accomplished in a ATM information system including a system processor and memory coupled to an adapter for receiving cells and reassembling the cells into sorted frames in system memory whereby the system information is stored at the frame level. The system supplies virtual circuit (VC) control information including frame sort information to the adapter. The adapter receives the cells and sorts the cells into partially completed ATM frames in system memory according to the VC control information. The adapter further includes means for determining when an end of frame indication is received in the cell. The end of cell determining means further includes means for indicating a pointer in system memory for complete frame lists to the most recently completed frame. Based upon the completed frame list, the system processor through a device driver processes frames on the completed frame list according to the priority of the list whereby the processor and device driver are freed from performing sorting and queuing of data frames.

In summary, the present invention overcomes the need that exists in prior art ATM communication systems with respect to queuing and sorting of data frames through the use of a communications adapter which links received frames on to received ready lists in system memory for processing by a device driver. The communication adapter operates independently and requires no intervention by the device driver. The device driver is alerted when attention is required, but this attention is not required prior to the linking of additional completed frames. By maintaining multiple receive ready lists for completed frames, the communications adapter can sort incoming frames in a manner that collects frames with similar handling requirements into a common list. In so doing, the device driver is freed from the burden of sorting these frames and may process the independent received ready list as appropriate. The result is improved performance by the device driver to handle delay sensitive traffic.

DESCRIPTION OF THE DRAWINGS

The invention will be more fully apprehended from the following detailed specification taken in conjunction with the drawing, in which.

DESCRIPTION OF THE PREFERRED EMBODIMENT

Figure 1:
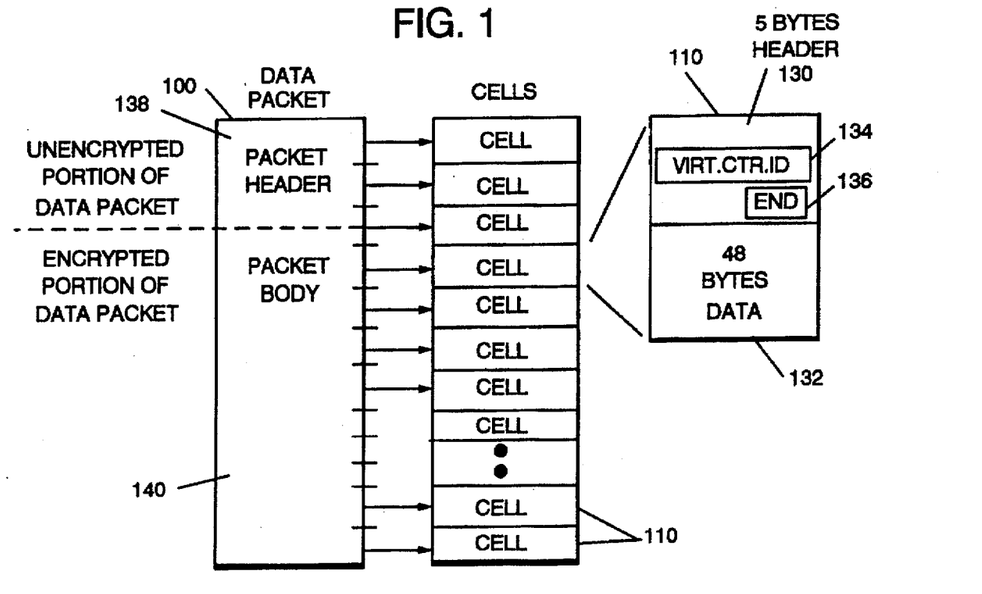
FIG. 1 is a block diagram of a prior art data packet and the corresponding data cells in which the packet is fragmented for purposes of transmission over a network.

Referring to FIG. 1, data packets 100 are transmitted in the form of data cells 110, each of which is 53 bytes long including a 5 byte header 130 and 48 byte data portion 132. Each data cell header 130 includes a virtual circuit identifier 134 and an end flag 136 that is only set for the last cell of each data packet.

Figure 2:
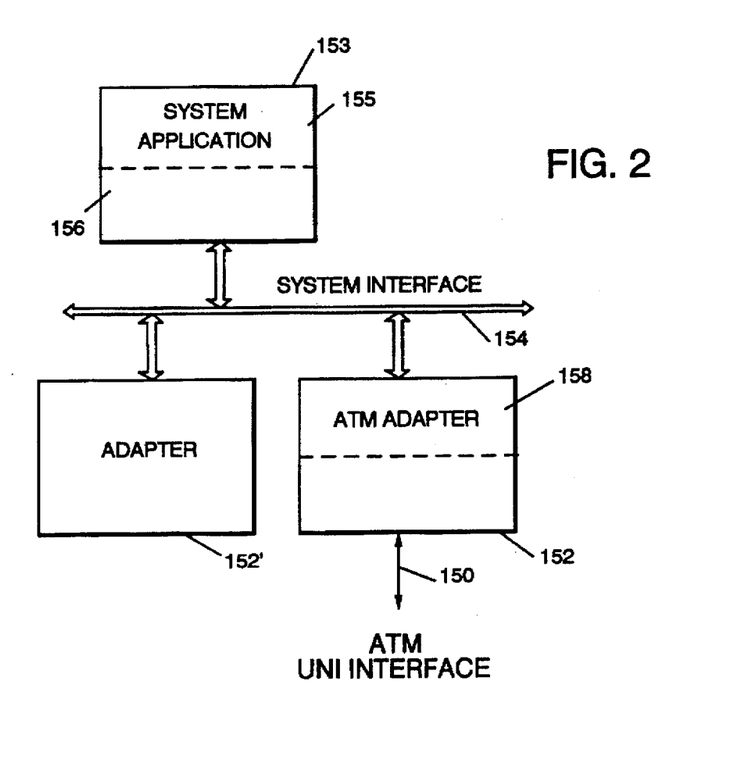
FIG. 2 is a block diagram of an ATM network incorporating the principles of the present invention.

In FIG. 2, the data cells 110 are transmitted from different data sources, such as, video, telephony, multimedia, etc. and may be interleaved on a network cable 150. An ATM adapter 152 is coupled to the cable 150 through an ATM user network interface (UNI). The adapter as will be described hereinafter sorts the data cells according to their virtual circuit identifier and passes them to a host system 153 including a system memory 300 (see FIG. 4) through a system interface 154. The adapter 152 includes a hardware interface (not shown) for storing data cells in one area of the system memory as partially completed ATM frames which are not linked. The adapter thereafter forms completed frames into received ready lists. Application programs 155 running in the processor process data frames on the receive ready list as provided by a device driver 156. Device drivers are programs usually regarded as part of, or an extension of a processors operating system and are dedicated to handling input from or output to a device. The device driver also processes interrupts generated associated devices such as adapter 152. A description of a device driver is given in a publication entitled "AIX Version 4.1 Writing a Device Driver", Second Edition, 1994, published by International Business Machines Corporation, Armonk, N.Y. 10557. In the case of the present invention, sorting of data cells into data frames on the receive ready list is performed independent of the device driver. The result is improved performance by the device driver with improved ability in handling delay sensitive traffic.

Figure 3:
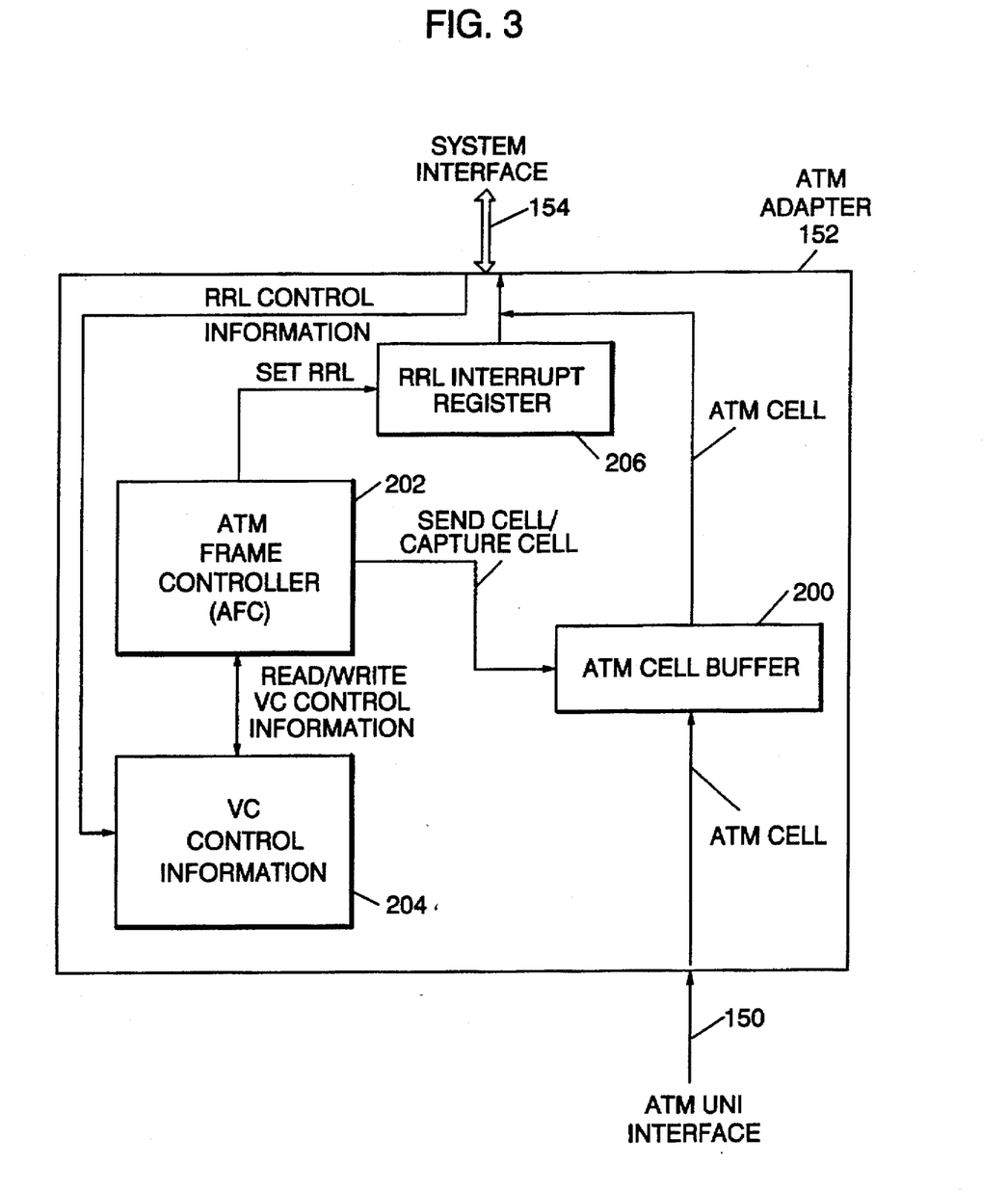
FIG. 3 is a block diagram of an adapter included in the network of FIG. 2.

In FIG. 3, the adapter 152 will be described in further detail. The adapter includes an ATM cell buffer 200 for temporarily storing a data cell supplied to the adapter on cable 150 through an ATM uni interface. An ATM frame controller 202 controls the buffer 200 in capturing a data cell and sending the data cell to a system memory 300 shown in FIG. 4. The controller 202 reads control information from a VC control register 204 in directing the data cell in the buffer 200 to the memory 300. The control information in the register 204 frame is supplied by the device driver 160 (see FIG.2). A Received Ready List Interrupt Register 206 is read by the device driver when a frame is ready to be processed by an application. When a data source desires to send data frames to the host processor 153, the device driver is notified of the quality of service desired by the data source and from which the device driver notifies the register 204 to which received ready list such data frames should be assigned for processing by an application 155 (see FIG.2).

Figure 4:
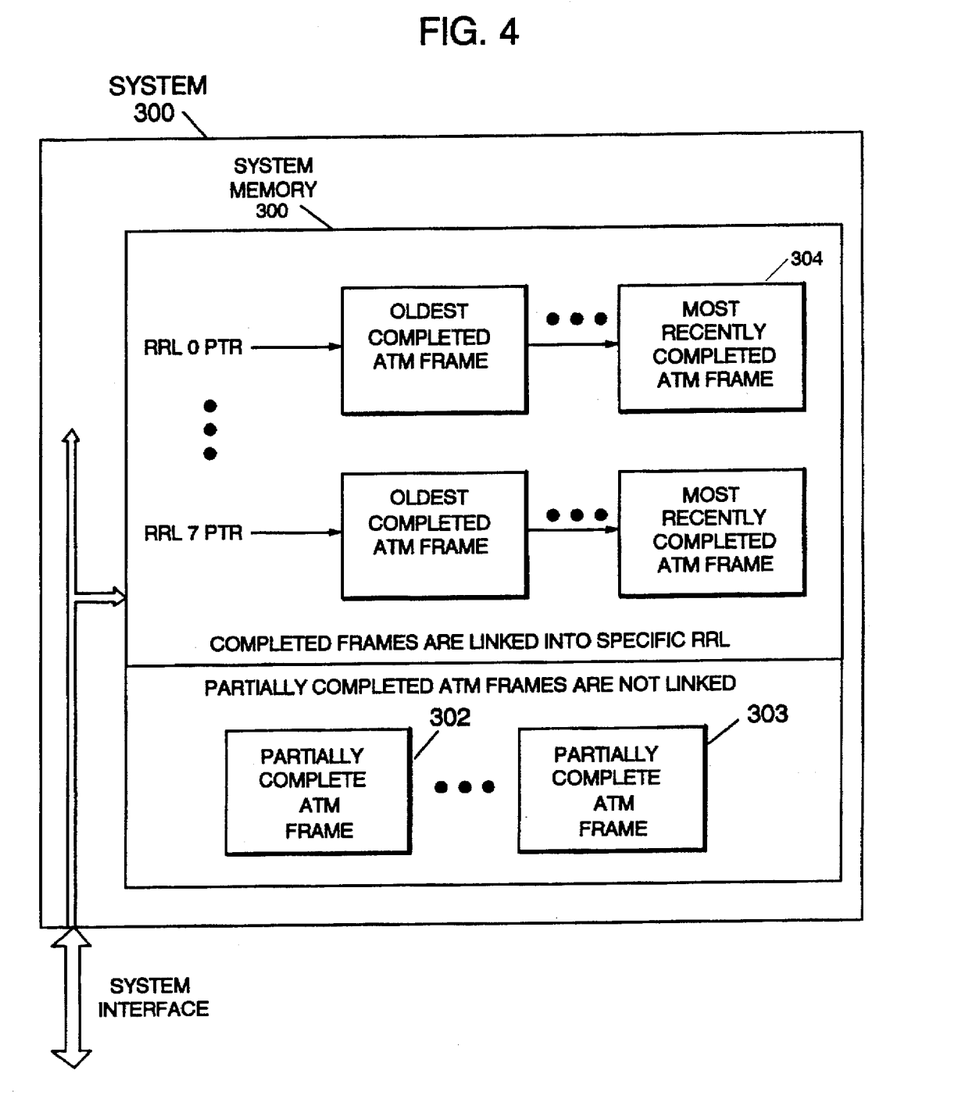
FIG. 4 is a block diagram of a host processor included in the network of FIG. 2.

In FIG. 4, data cells transferred into the system memory 300 by the controller 202 are assigned to partially complete ATM frames 302 . . . 30(n) according to their virtual circuit identifiers. When a data cell including an end of frame indication is received in the buffer 200, the frame controller 202 reads the register 204 and links the completed ATM frame in system memory 300 to the most recently completed frame received ready list system address 304 for the data source associated with the received ready list. Each data source is associated with a received ready list in the system memory which is processed by the device driver according to the priority assigned to the virtual circuit identifier for that data source. Simultaneously, the controller 202 updates the register 204 so the next time another completed frame is formed, a pointer assigned to the completed data frame will point to the most recently completed ATM frame. Thereafter, the controller notifies the device driver by setting an interrupt register 206. The controller sets in the register a bit which identifies the specific received ready list indicating a completed frame which the device driver processes according to the priority of the received ready list being processed.

Figure 5:
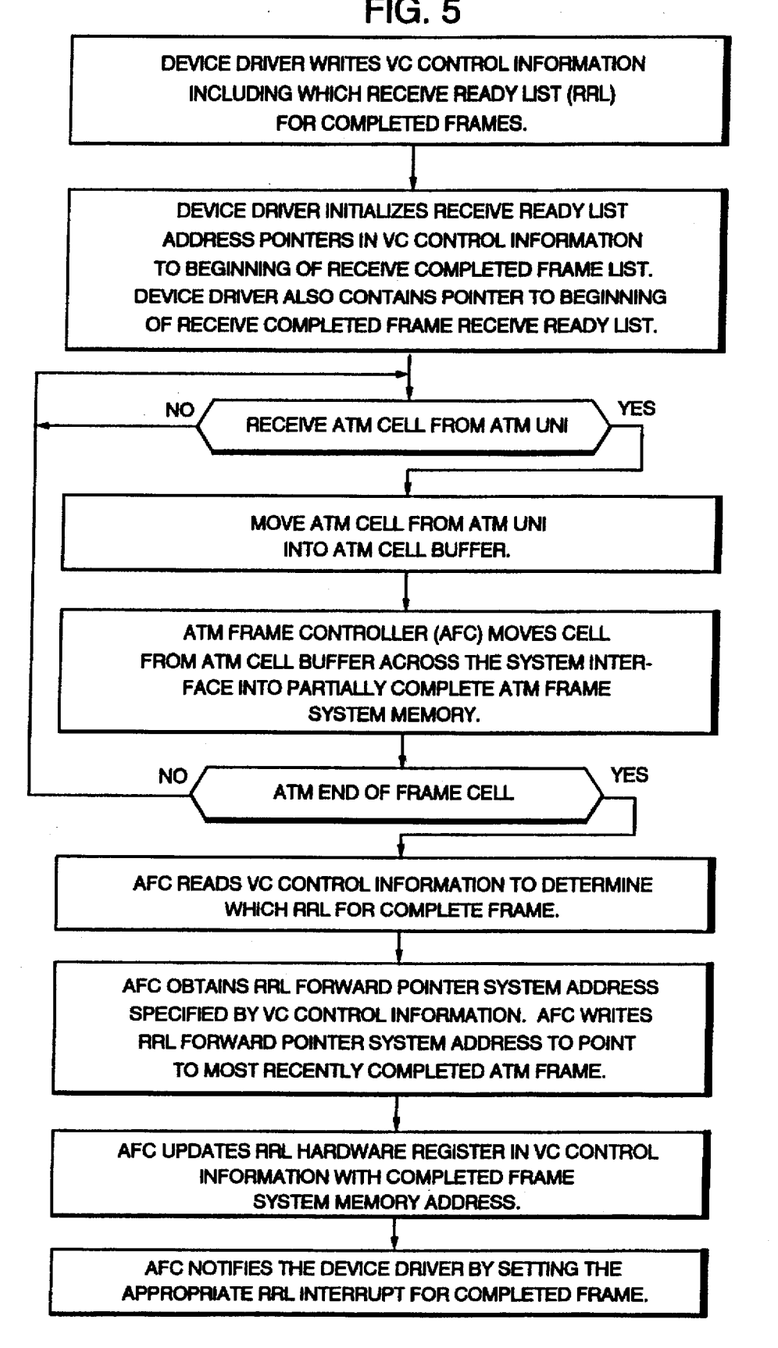
FIG. 5 is a flow diagram for processing data cells received at the user network interface into completed frames stored in received ready lists stored in the memory of FIG. 4.

In FIG. 5, the operation of invention will be described in processing data cells into prioritized received ready lists. An operation 501 initiates the device driver 160 (See FIG. 2) to write VC control information into register 204 including which received ready list will be used for completed frames. In an operation 503, the device driver initializes Receive Ready List Address pointer in VC control information to the beginning of the receive completed frame list. The device driver also contains a pointer to the beginning of the recently completed frame receive ready list. An operation 505 monitors the ATM cell buffer 200 for reception of data cells from the ATM uni interface. A "no" condition continues the monitoring of the ATM uni interface. A "yes" condition initiates an operation 507 in which an ATM data cell from the ATM uni interface is received into the ATM cell buffer 200. In an operation 509, the ATM frame controller 202 moves the data cell from the ATM cell buffer across the system interface 154 into partially complete ATM frames system memory 302 . . . 30(n) according to the circuit identifier for the data cell. The data cells are monitored in an operation 511 for an end of frame cell indication. A "no" condition repeats the process steps 505, 507, 509 until an end of frame cell indication is received which initiates a "yes" condition. An operation 513 is initiated by the "yes" condition whereupon the frame controller reads the control information in the register 204 to determine which received ready list will receive the completed frame. In operation 515 the frame controller obtains the Receive Ready List forward pointer system address specified by the virtual channel control information. The frame controller writes the Receive Ready List forward pointer system address to point to the most recently completed ATM frame. The frame controller 202 updates the Receive Ready List hardware register in the VC control information with completed frame system memory address in an operation 517. The frame controller notifies the device driver of a completed frame in an operation 519 by setting the appropriate received ready list interrupt for the completed frame. The device driver initiates processing of the frame according to the priority of the received ready list for the data source supplying the frame to the host system.

Figures 6, 6B:
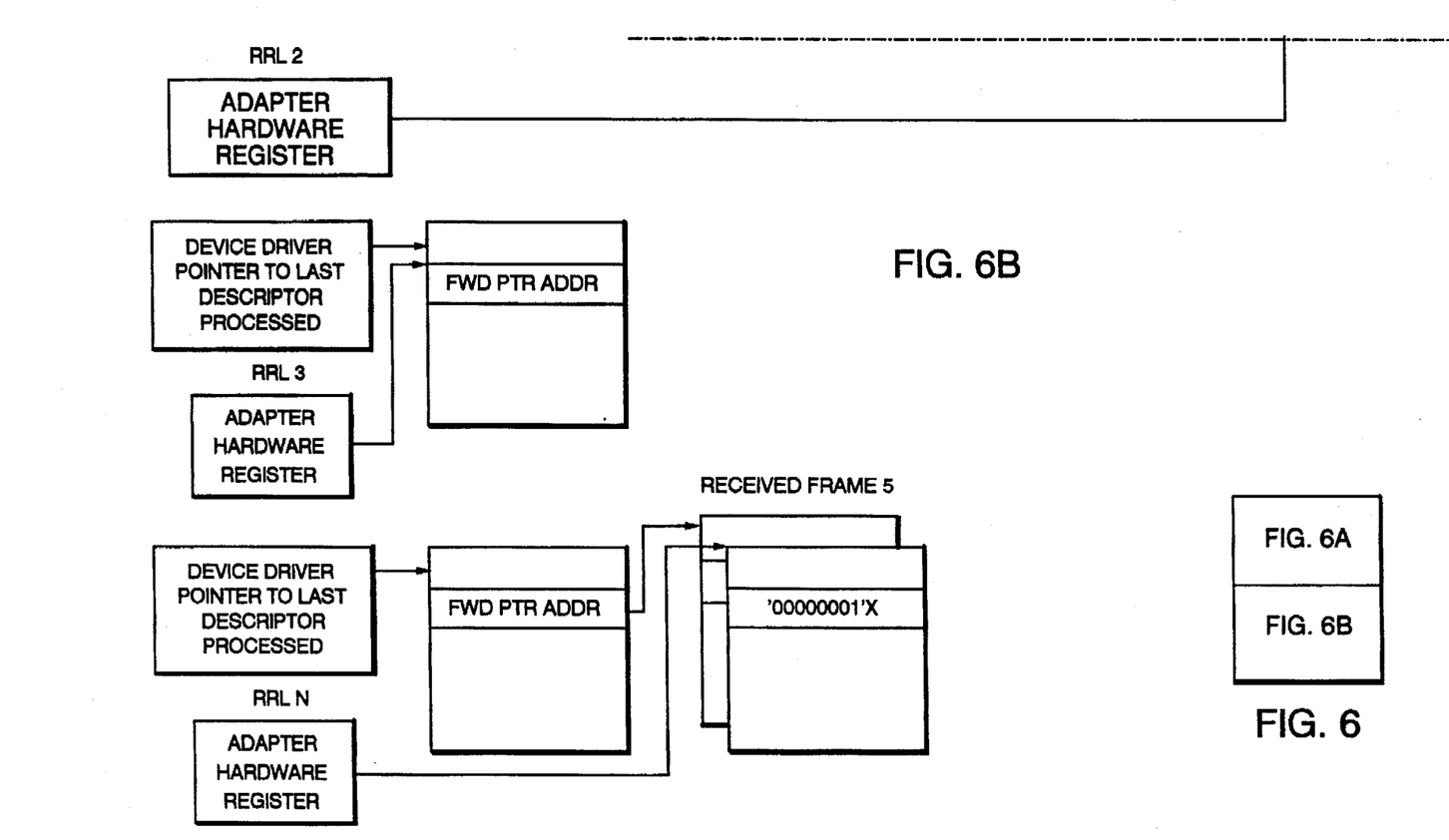
FIG. 6 (composed of FIG.6A and FIG.6B) is a representation of received ATM frames sorted and queued in the system memory of FIG. 4, according to the priority of the frames on the received ready list.
Figure 6A:
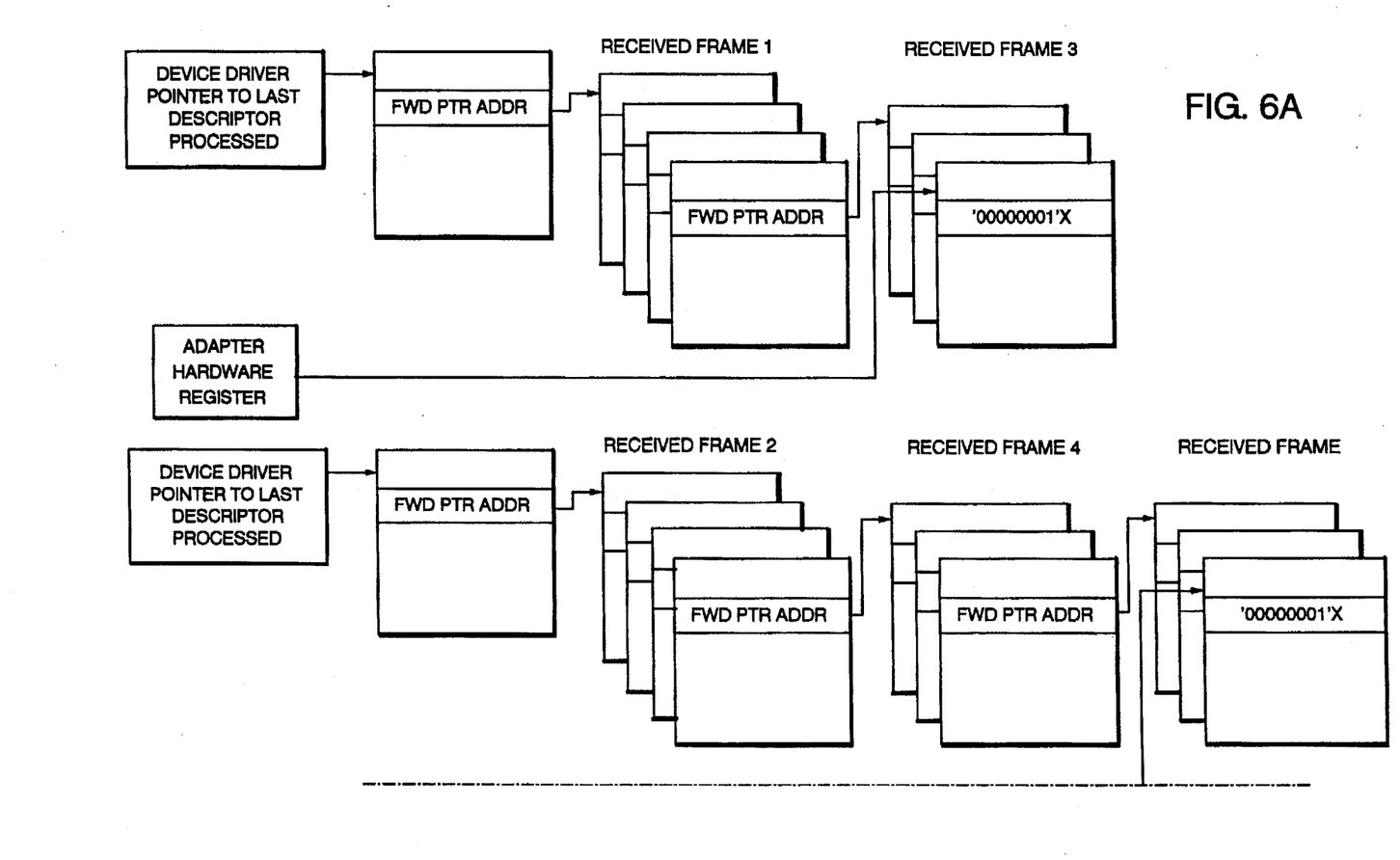

FIG. 6 (composed of FIG.6A and FIG.6B) shows received ready list, RRL1 through RRLN. RRL1 has received frames 1 and 3 with frame 1 pointing to receive frame 3 which is the most recently completed ATM frame for received ready list and includes an end of frame indication (00000001'X). The control register 204 includes a pointer for received ready list 1 to receive frame 3.

Received ready list 2 has received frames 2, 4 and 6 and the control register 204 includes a pointer for receive ready list 2 through frame 6 as the most recently completed ATM frame which includes an end of frame indication (00000001'X).

The received ready list 3 has not received any data frames so that the control information registered 204 for received ready list 3 points to the same position as the forward pointer address for the device driver.

The box labels RRLN (1) <=X <(n) is a register in the adapter hardware and the adapter register that contains the pointer to the last attached buffer description for that received ready list. The adapter uses this register to locate the tail of the buffer stream when attaching the next completed frame. After the adapter attaches a new list of buffers for a received frame, it will update the RRLN register with a pointer to the last buffer associated with the frame.

In summary, the present invention prioritizes ATM frames, not cells, by using a received ready list concept. Prioritized frames do not mean one ATM frame will be dropped due to another frame having a higher priority. Instead, all frames are processed, but higher priority frames get served first. All ATM frames are stored in system memory. ATM frames do not exist in an adapter. Frames are not segmented in memory to differentiate priority. All frames exist in the same memory pool. A number of priority received ready list dictate how may priorities are available. The number of priorities has no dependency on memory space. The device driver selects a received ready list to process according to a priority assigned to a data source. The device driver propagates through the specific received ready list until a higher priority frame is received for another list whereupon the device process switches to the higher priority received ready list. Finally, the system device driver does not become involved in processing frames until the completed ATM frame has arrived. The capture of the ATM frames in the specific priority list is disjoint from the system processing. This frees the system processor to perform other functions until a complete ATM frame has arrived. Having the frame stored in system memory eliminates the need for the device driver to perform any data transfers from the adapter. All data is at the system's fingertips.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

What is claimed:

1. An information system including a system processor with memory and an adapter for receiving data cells and reassembling the cells into sorted prioritized frames in system memory whereby the system can process information at the frame level comprising:
   means for supplying to the adapter virtual circuit control information including prioritized frame sort information for a plurality of data sources;
   means for receiving and sorting cells into partially completed ATM frames in a first area of the system memory according to the virtual circuit control information;
   means for determining when an end of frame indication is received in a cell;
   means for linking completed frames onto one of a plurality of received ready lists in a second separate area of the system memory according to a priority of the list;
   means for updating a pointer in the system memory for a prioritized completed frame list through a most recently completed frame; and
   means for serving the data sources with frames according to the highest priority data source.

2. The system of claim 1 wherein data cells are stored in system memory in partially completed frames according to the virtual circuit control information until a frame is complete whereupon the completed frame is linked in system memory to a received ready list for the most recently completed frame according to the virtual circuit control information.

3. The system of claim 2 wherein the system memory includes a plurality of received ready lists of frames prioritized according to the virtual circuit control information.

4. The system of claim 3 wherein data cells are reassembled into data frames while the system processor performs other functions.

5. The system of claim 4 further including a device driver in the system processor for supplying virtual circuit control information to the means for supplying virtual circuit control information to the adapter.

6. The system of claim 5 further including controller means for reading the virtual circuit control information to transfer a data cell into system memory.

7. The system of claim 6 further including interrupt means which when set by the controller means notifies the device driver that a recently completed frame in system memory is linked to a received ready list.

8. The system of claim 7 wherein the controller means writes into a virtual circuit control information register a pointer indicating an address of the most recently completed frame system memory address.

9. An ATM information system for processing and prioritizing data at the frame level comprising:
   a system processor and a system memory
   an adapter for receiving data cells from an ATM unit and sorting the data cells into partially completed ATM frames for storage in a first area of the system memory;
   said adapter including further means providing control information to a controller for linking completed ATM frames on one of a plurality of prioritized received ready lists for storage in a second separate area of the system memory according to a priority of a data source supplying the data cells;
   said controller means further responsive to the control information to obtain a pointer to most recently completed ATM frame for each prioritized received ready list; and
   means for generating an interrupt when a frame has been added to a received ready list notifying the system processor for processing data at the frame level.

10. The information system of claim further including means for exchanging virtual circuit information with the controller.

11. The information system of claim wherein the controller controls a cell buffer to capture data cells for transfer to the system memory.

12. The information system of claim 11 where the controller receives information from a control register with respect to the storage of data frames on received ready lists and writes information to the control register indicating the address of most recently completed frames in a received ready list.

13. The information system of claim 12 further including a received ready list interrupt register for notifying the system processor when a completed frame has been linked to a received ready list.

14. The information system of claim 13 wherein the system memory links completed ATM frames on received ready list according to priority of a data source associated with the received ready list.

15. The information system of claim 14 wherein the adapter includes addresses for storing partially completed ATM frames.

16. In an ATM information system including a system processor having a device driver and a system memory coupled to an adapter including a cell buffer, a frame controller, a virtual circuit control information register and an interrupt register, a method for processing data cells onto prioritized frame levels comprising the steps of;

a) writing virtual circuit control information into the virtual circuit control register using the device driver to indicate one of a plurality of prioritized receive ready lists for linking completed frames in system memory;

b) monitoring the data cells from a communication network for processing by the system; a "no" condition continuing the monitoring of the network; a "yes" condition moving the data cell from the network into the cell buffer;

c) transferring the data cell from the cell buffer across a system interface into a partially completed frames storage area in the system memory using the frame controller;

d) monitoring the cell buffer for an end of frame indication in a data cell; a "no" condition repeating steps a, b, and c; a "yes" condition activating the frame controller to read virtual circuit control information to determine one of the prioritized received ready list to link completed frames;

e) linking completed ATM frames in a completed frame storage area in the system memory to the most recently prioritized received ready list system address specified by the virtual circuit control information using the frame controller;

f) updating the virtual circuit control information with a completed frame system memory address using the frame controller; and g) notifying the device driver by setting a appropriate received ready list interrupt for completed frames using the frame controller to activate the interrupt register.

17. The method of claim 16 further including the step of obtaining the received ready list forward pointer system address specified by the virtual circuit control information using the frame controller.

18. The method of claim 16 further including the step of writing received ready list forward pointer system address to point to the most recently completed frame in system memory using the frame controller.

* * * * *

UNITED STATES PATENT AND TRADEMARK OFFICE
CERTIFICATE OF CORRECTION

PATENT NO.  : 5,732,082
DATED       : March 24, 1998
INVENTOR(S) : Mark C. Wartski, Russell E. Schroter & Joseph K. Lee It is certified that error appears in the above-identified patent and that said Letters Patent is hereby corrected as shown below:

Claim 10, line 1, after "claim" insert -- 9 --

Claim 11, line 1, after "claim" insert -- 9 --

Signed and Sealed this

Twenty-fifth Day of April, 2000

Attest:

Q. TODD DICKINSON

*Attesting Officer*     *Director of Patents and Trademarks*